United States Patent [19]

Esser

[11] Patent Number: 5,044,670
[45] Date of Patent: Sep. 3, 1991

[54] PIPE FOR CONVEYING SOLID MATTER

[75] Inventor: Alexander Esser, Warstein, Fed. Rep. of Germany

[73] Assignee: Esser-Brieden GmbH & Co. KG

[21] Appl. No.: 440,996

[22] Filed: Nov. 22, 1989

[30] Foreign Application Priority Data

Nov. 24, 1988 [DE] Fed. Rep. of Germany ....... 3839582

[51] Int. Cl.$^5$ .............................................. F16L 55/18
[52] U.S. Cl. ........................................ 285/16; 285/55; 285/112; 285/286; 285/416
[58] Field of Search ...................... 285/15, 16, 17, 55, 285/112, 286, 416

[56] References Cited

U.S. PATENT DOCUMENTS 4,336,958  6/1982  Goetzinger ..................... 285/416 X
4,659,118  4/1987  Schwyter et al. .................... 285/55
4,691,740  9/1987  Svetlik ............................... 285/55 X Primary Examiner—Dave W. Arola
Attorney, Agent, or Firm—Toren, McGeady & Associates

[57] ABSTRACT

A pipe for conveying solid matter, particularly for conveying concrete. The pipe has a cylindrical middle portion and a double-layer welding neck with annular coupling flange at each end of the middle portion. The inner layer is replaceably clamped in the outer layer in a positively locking and frictionally engaging manner. This is accomplished by a roof-like bevel of the inner layer which is engaged by a corresponding inner groove of the outer layer which is of limited elasticity. The inner diameter of the inner layer may be smaller than the inner diameter of the cylindrical middle portion.

9 Claims, 1 Drawing Sheet

PIPE FOR CONVEYING SOLID MATTER

BACKGROUND OF THE INVENTION

1. Field of the Invention

The present invention relates to a pipe for conveying solid matter, particularly for conveying concrete.

2. Description of the Related Art

A pipe of this type disclosed in German Patent 33 24 658 is composed of a cylindrical middle portion and double-layer welding necks at the ends of the middle portion. The cylindrical middle portion may be composed of a single layer. However, the middle portion is preferably constructed with two layers, wherein the core or inner pipe consists of a hardenable carbon steel and the outer pipe consists of a wrought steel. The welding necks also are composed of two layers. The inner layer of each welding neck is of a material which is more resistant to wear than the material of the outer layer.

The inner and the outer layers have the same length and the end faces thereof extend in the same transverse plane. An annular coupling flange of each welding neck may be an integral component of the outer layer. However, the annular coupling flange may also be welded to the outer layer. This known pipe for conveying solid matter has been found useful in conveying solid matter in underground mining and as pipe used in ships, such as, siphons or the like.

If a pipe of the above-described type is used for conveying concrete, it has been found that frequently an increased wear occurs at the inlet side of the pipe even though the inner layer of the welding neck is of a material which is more resistant to wear. A reason for this disproportional wear at the inlet end of a concrete conveying pipe is the play between the two end faces of two abutting concrete conveying pipes and the circumferential pipe coupling which permits this play. The play leads to radial offsetting of two abutting webs with the consequence that the concrete impinges on portions of the end face of the downstream pipe in conveying direction. Another reason is the fact that, in practical use, concrete conveying pipes of one manufacturer are combined with cast bends, conical pipes or Y-pipes of another manufacturer. This means that, even when the differences of the diameters of the pipes which are coupled to each other are initially only slight, an increased wear was observed at the hardened inner layers of the welding necks because of the different resistances to wear of the successive pipes. Thus, depending on the relative positions of the pipes which are coupled to each other in relation to the pipe axis, this results even after a relatively short time in substantial wear of the inlet side of the inner layer of a welding neck almost up to the softer outer layer.

As a result, in the past, a concrete conveying pipe had to be completely replaced even if only the inlet portion was worn over a short length. Accordingly, it was necessary to provide a large number of concrete conveying pipes which are ready for use.

Another requirement of the known pipe for conveying solid matter is that the end faces of the cylindrical middle portion must be precisely worked in order to ensure narrow gaps between middle portion and welding necks after these components have been joined. This is because narrow gaps require sealing rings of small volume. In the past, such sealing rings were absolutely required because, when welding the welding necks to the cylindrical portion, it was necessary to prevent the cooling water necessary for maintaining the hardness of the inner pipe from reaching the welding location during welding and thereby impairing the quality of the welding seam. Therefore, it was necessary in the past to carry out expensive and, thus, uneconomical measures for cutting a piece of pipe required for the middle portions from a length of pipe.

It is, therefore, the primary object of the present invention to provide a pipe for conveying solid matter of the above-described type in which the end portion of the pipe has such a resistance to wear that, independently of the type and the service life of the pipe element arranged upstream of the pipe in conveying direction, i.e., a cast bend, a conical pipe, a Y-pipe, the full service lift of the conveying pipe can be ensured, particularly when concrete is conveyed.

SUMMARY OF THE INVENTION

In accordance with the present invention, a pipe for conveying solid matter, particularly for conveying concrete, has a cylindrical middle portion and a double-layer welding neck with annular coupling flange at each end of the middle portion. The inner layer of each welding neck is made of a material which is more wear-resistant than the material of the outer layer. The end faces of the inner layer and of the outer layer extend in the same transverse plane. The outer layer has a substantially greater length than the inner layer. The inner layer is replaceably clamped in the outer layer in a positively locking and frictionally engaging manner.

The mounting in a positively locking and frictionally engaging manner of the inner layer of the welding neck in the outer layer of the welding neck makes it now possible to replace merely a substantially worn inner layer in dependence upon the condition of use of the pipe element arranged upstream. It is no longer necessary to replace the entire concrete conveying pipe. Rather, it is now possible that even an unskilled worker, after a short learning period, can repair without problems a pipe for conveying solid matter, particularly for conveying concrete, by replacing within a very short period the inner layer of the welding neck at the inlet side of the pipe. In this manner, a conveying pipe can be adapted easily to any upstream conveying element, e.g., cast bend, conical pipe, Y-pipe.

Another advantage of the pipe according to the present invention is that the cylindrical middle portion of the pipe, whether it is a single-layer pipe or the preferred double-layer pipe, can now be inserted during assembly and prior to welding far into each welding neck until it makes contact with the inner layer. As a result, the gap between the inner layer and the middle portion is substantially distanced from the welding point. This large distance between gap and welding point alone already prevents a significant flow of cooling water to the welding location without requiring auxiliary means during welding. A sealing member which is advantageously inserted in the gap is also not subjected to high thermal loads because of the large distance from the welding point. During welding, cooling water cannot reach the welding point. Thus, the desired quality of the welding seams for fixing the welding necks to the cylindrical middle portion is ensured.

In accordance with an advantageous further development of the present invention, the length of the outer layer is two to three times the length of the inner layer.

For example, the length of the inner layer may be equal to or slightly shorter than the width of the annular coupling flange at the circumference of the outer layer.

In accordance with another advantageous feature of the present invention, the inner layer is beveled at the outer circumference thereof in longitudinal direction of the pipe. The bevel is a roof-like bevel formed by a forward roof surface which is inclined toward the end face and a rearward roof surface which is inclined toward the middle portion of the pipe. Over the length of the roof-like bevel, the outer layer is of limited elastic construction. The roof-like bevel of the inner layer is tightened into the portion of the outer layer of limited elastic construction. The forward roof surface is substantially shorter than the rearward roof surface. As a result of the inclined roof surfaces and a corresponding inner groove in the outer layer, it is now possible to remove a worn inner layer easily from the welding neck. When an axial force is applied, the forward roof surface radially widens the rim of the outer layer at the inlet side as permitted by the elasticity of the material, so that the inner layer can subsequently be pulled easily out of the welding flange. As the inner layer is pulled out, the rim of the outer layer is biased against the rearward roof surface. When a new inner layer is inserted, the rim of the outer layer on the inlet side slides on the rearward roof surface and is elastically widened until the rim of the outer layer returns resiliently after the apex of the two inclined roof surfaces has passed the rim. The rim of the outer layer now rests against the front roof surface of the inner layer and holds the inner layer in a clamping position.

The inclined roof surfaces have the double purpose of facilitating the removal and the insertion of an inner layer and to maintain the fixed position of the inner layer during operation. Particularly the capability of fixing the position of the inner layer provides the advantage that the invention can also be easily used at the outlet end of a conveying pipe. There is no danger that, due to the different wear conditions of middle portion and inner layer of the welding neck and/or the different diameters, the inner layer is forced out of the outer layer by the material to be conveyed, particularly concrete. Consequently, there is the additional advantage that in the invention as used at both ends of the conveying pipe, it is not necessary to consider the position of the conveying pipe in relation to the conveying direction when a new conveying pipe is to be placed in the pipe line.

In accordance with a further feature of the present invention, the ratio of the length of the forward roof surface to the length of the rearward roof surface is 1:5 to 1:15, preferably about 1:10. As a result, the removal of a worn inner layer and the insertion of a new inner layer are substantially improved. In addition, a further safety measure is provided when fixing the inner layer in the outer layer.

The present invention further provides that the forward inclined roof surface is inclined more steeply than the rearward inclined roof surface. This feature makes it possible to take into consideration the different conditions encountered when removing a worn inner layer and when inserting a new inner layer. The angle of inclination of the rearward roof surface may be, for example, approximately 10° and the angle of inclination of the forward roof surface may be about 30°.

The inner diameter of the inner layer may be smaller than the inner diameter of the cylindrical middle portion. This provides the advantage that for removing the inner layer a suitable tool can act on the inner layer and the inner layer can thus be pulled without problems out of the outer layer.

In accordance with another advantageous feature, an annular collar protrudes from the outer layer between the inner layer and the cylindrical middle portion. The inner diameter of the annular collar is greater than the inner diameter of the inner layer. As a result, the tool for removing the inner layer can act more easily on the inner layer. The inner diameter of the inner layer may be equal to or smaller than the inner diameter of the cylindrical middle portion.

A sealing member may be provided between the inner layer and the cylindrical middle portion. If the sealing member is of suitable material, an appropriate tool for removing the inner layer can act on the inner layer. On the other hand, the provision of the sealing member leads to the advantage that a cylindrical middle portion can be cut from a length of pipe by means of inexpensive tools. For example, it is now possible to use the plasma cutting method. This method leads to relatively irregular cut surfaces, however, the method can be carried out very economically particularly on a double-layer pipe with hardened inner pipes. The elastic sealing member acts to compensate between the irregular end surface of the middle portion and the end surface of the inner layer of a welding neck and, thus, ensures that, during welding of the welding neck to the middle portion, no cooling water can reach the welding point and impair the quality of the welding seam.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

DESCRIPTION OF THE PREFERRED EMBODIMENT

Figure 1:
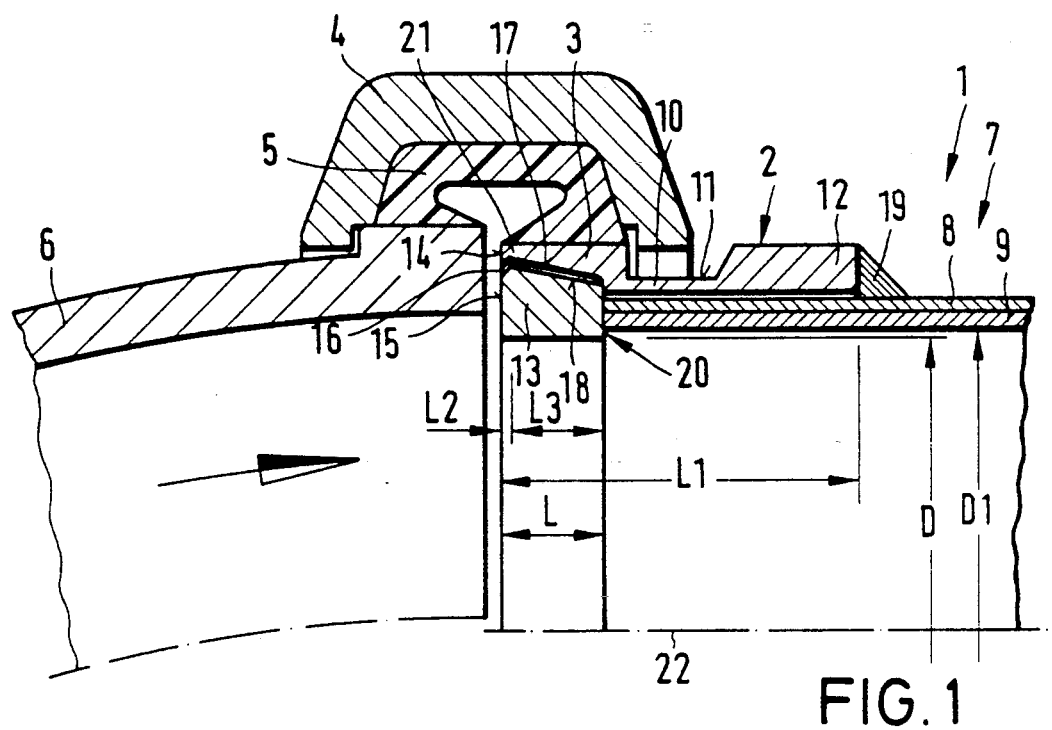
FIG. 1 is a partial longitudinal sectional view showing the transition from a cast bend to a straight concrete conveying pipe.
Figure 2:
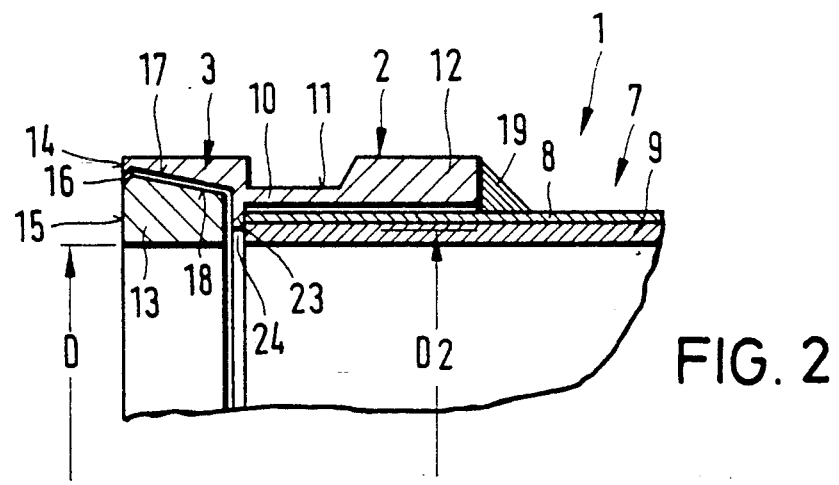
FIG. 2 is a partial longitudinal sectional view of the end portion of another embodiment of a concrete conveying pipe.
Figure 3:
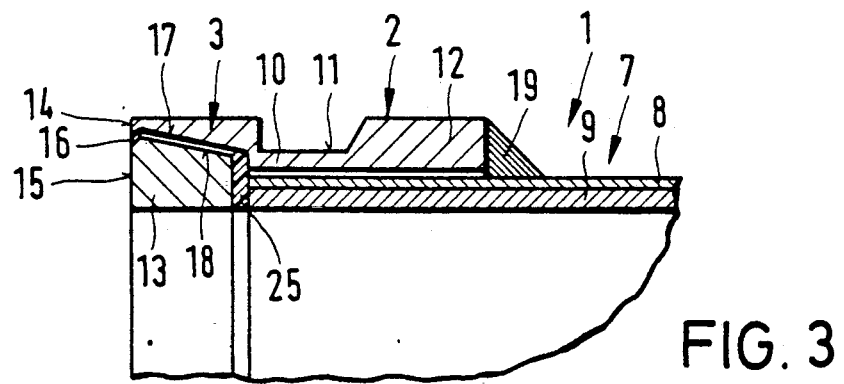
FIG. 3 is a partial longitudinal sectional view of the end portion of a third embodiment of a concrete conveying pipe according to the present invention.

In FIGS. 1 to 3 of the drawing, reference numeral 1 generally denotes a concrete conveying pipe as it is used for conveying concrete from a concrete mixer or a concrete hauler to a location where the concrete is used. The end faces of such pipes 1 are joined to form a pipe line by connecting the pipes 1 through welding flanges 2 with annular coupling flanges 3 and by means of couplings 4 with sealing members 5 which surround the annular coupling flanges 3. This type of coupling is also used when straight concrete conveying pipes 1 are connected with conical pipes, Y-pipes or, as shown in FIG. 1, with cast bends 6.

As illustrated in FIG. 1, the inlet side of the concrete conveying pipe 1 may be radially offset relative to an abutting concrete conveying pipe 1 or another pipe element, such as, a cast bend 6. This inevitably results in an increased wear at the inlet side of the concrete conveying pipe 1. The concrete conveying pipe 1 is radially offset relative to the other element because of the abutting arrangement of the end faces of the elements to permit replacement of the elements in a closed pipe line in connection with the play between the couplings 4 and the concrete conveying pipes 1 and the connected pipe elements.

The concrete conveying pipes 1 illustrated in FIGS. 1 to 3 each have a cylindrical double-layer middle portion 7. The outer pipe 8 of middle portion 7 is of a ductile material, such as, wrought steel, while the inner pipe 9 is flame-hardened. Inner pipe 9 and outer pipe 8 are pressed together, for example, by hardening. Pipes 8 and 9 are of equal length.

The welding necks 2 are approximately L-shaped in cross-section and are also constructed with two layers. The outer layer 10 with the annular coupling flange 3, the coupling groove 11 and the welding flange 12 are of wrought steel, while the inner layer 13 is of a material which is more resistant to wear than the material of the outer layer 10.

The end faces 14, 15 of outer layer 10 and inner layer 13, respectively, are located in the same transverse plane. However, as can be seen in FIGS. 1–3, the ratio of length L of the inner layer 13 to the length L1 of the outer layer 10 is approximately 1:3.

As FIGS. 1–3 of the drawing further show, the inner layer is beveled at the outer circumference thereof in the shape of a roof defined by a forward inclined roof surface 16 and a rearward inclined roof surface 17. The outer layer 10 has an inner groove 18 which corresponds to the roof-like surfaces 16, 17. In the area of the groove 18, the outer layer 10 is radially elastic to a limited extent. The ratio of the length L2 of the forward inclined surface 16 to the length L3 of the rearward inclined surface 17 is 1:10. As can also be seen in the drawing, the forward inclined surface 16 has a steeper inclination than the rearward inclined surface 17. For example, the angle of inclination of the rearward inclined surface 17 is 10° and the angle of inclination of the forward inclined surface 16 is 30°.

The welding neck 2 is L-shaped, wherein the short side of the L-shape is essentially formed by the inner layer 13, while the long side is formed by outer layer 10. Due to this L-shape, the middle portion 7 can be moved until it makes contact with the inner layer 13 and the outer layer 10 surrounds the middle portion 7. Subsequently, the outer pipe 8 of the middle portion 7 is welded to the welding flange 12 of the welding neck 2. During welding, the inner pipe 9 of the middle portion 7 must be cooled which is done by means of cooling water. For this purpose, a sealing member is usually inserted between the inner layer 13 and the middle portion 7 which prevents cooling water from reaching the welding location and impairing the quality of the welding seam 19. This sealing member is not illustrated in detail in FIGS. 1 and 2.

In the embodiment illustrated in FIG. 1 of the drawing, the inner diameter D of the inner layer 13 is smaller than the inner diameter D1 of the middle portion 7. As a result, it is possible to pull the inner layer 13 out of the outer layer 10 by means of a suitable tool which acts on the annular surface 20 of the inner layer 13. When the inner layer 13 is pulled out, the forward inclined surface 16 of the inner layer 13 radially widens the free rim 21 of the welding neck 2 and, when the inner layer 13 is pulled out further, the free rim 21 lies on the rearward inclined surface 17.

When a new inner layer 13 is inserted in place of the worn inner layer, the gradually rising rearward inclined surface 1 widens the free rim 21 of the outer layer 10. After the apex of the inclined surfaces 16, 17 has passed the free rim 21, the rim 21 is again moved radially resiliently inwardly toward the center axis 21 of the pipe 1 and, as a result, the inner layer 13 is clamped into the outer layer 10.

The embodiment of FIG. 2 differs from the embodiment of FIG. 1 in that an annular collar 23 extends radially inwardly from the outer layer 10 and between the inner layer 13 and the cylindrical middle portion 7. The inner diameter D2 of the annular collar 23 is greater than the inner diameter D of the inner layer 13. The inner diameter D of the inner layer 13 may be equal to or smaller than the inner diameter D1 if the middle portion 7. The annular collar 23 creates an annular groove 24 in which a tool can be applied for pulling the inner layer 13 out of the outer layer 10 when the inner layer 1 is to be replaced.

Of course, it is also possible in this embodiment to provide a sealing member between the annular collar 23 and the end face of the middle portion 7. During welding of the welding neck 2 to the middle portion 7, the sealing member prevents cooling water from reaching the welding location. As a result, the quality of the welding seam 19 is ensured.

In the embodiment of FIG. 3, an intentionally relatively soft sealing member 25 is provided between the inner layer 13 and the cylindrical middle portion 7. The material of the sealing member 25 is such that a tool can be applied for pulling the inner layer 13 out of the outer layer 10 in order to replace the inner layer 13.

During welding of the welding flange 2 to the middle portion 7, the sealing member 25 simultaneously serves to prevent cooling water from flowing to the welding location. The sealing member 25 additionally makes it possible to cut a middle portion 7 from a length of pipe by means of an inexpensive cutting method, for example, the plasma cutting method, without the relatively uneven end faces of the middle portion 7 resulting in leaks between the inner layer 13 and the middle portion 7 during the welding procedure. Thus, the sealing member 25 compensates for the irregularities of the end surfaces.

While specific embodiments of the invention have been shown and described in detail to illustrate the application of the inventive principles, it will be understood that the invention may be embodied otherwise without departing from such principles.

I claim:

1. In a pipe for conveying solid matter, the pipe having a cylindrical middle portion with two ends, a double-layer welding neck welded to the middle portion at each end of the middle portion, the welding neck being composed of an inner layer and an outer layer and an annular coupling flange overlying the end of the cylindrical middle portion, the inner layer of each welding neck being of a material which is more resistant to wear than the material of the outer layer, the inner layer and the outer layer having end faces spaced axially outwardly from the end of the middle portion, the end faces of the inner layer and of the outer layer extending in a common transverse plane, the improvement comprising the outer layer having a substantially greater length than the inner layer, and means for replaceably locking and frictionally clamping the inner layer in the outer layer.

2. The pipe according to claim 1, wherein the outer layer is two to three times longer than the inner layer.

3. The pipe according to claim 1, wherein the inner layer has an outer circumferential surface which is beveled in the shape of a roof, the roof-like bevel being formed by a forwardly inclined roof surface and a rearwardly inclined roof surface, the outer layer being of a material of limited elasticity in a longitudinal portion thereof which is coextensive with the roof-like bevel of the inner layer, the longitudinal portion of the outer layer defining a circumferential inwardly facing groove which corresponds in shape to the roof-like bevel of the inner layer, wherein the length of the forwardly inclined roof surface is substantially shorter than the length of the rearwardly inclined roof surface.

4. The pipe according to claim 3, wherein the forwardly inclined roof surface is more steeply inclined than the rearwardly inclined roof surface.

5. The pipe according to claim 3, wherein the ratio of the length of the forwardly inclined roof surface to the length of the rearwardly inclined roof surface is 1:5 to 1:15.

6. The pipe according to claim 4, wherein the ratio of the length of the forwardly inclined groove surface to the length of the rearwardly inclined roof surface is 1:10.

7. The pipe according to claim 1, wherein the inner layer and the cylindrical middle portion each have an inner diameter, the inner diameter of the inner layer being smaller than the inner diameter of the cylindrical middle portion.

8. The pipe according to claim 1, wherein the outer layer has a radially inwardly facing annular collar which extends between the layer and the cylindrical middle portion, the annular collar and the inner layer each having an inner diameter, the inner diameter of the annular collar being greater than the inner diameter of the inner layer.

9. The pipe according to claim 1, comprising a sealing member between the inner layer and the cylindrical middle portion.

* * * * *